(No Model.)

H. H. COVERT.
BICYCLE REST.

No. 563,570. Patented July 7, 1896.

WITNESSES:
William P. Goebel
M. V. Bidgood

INVENTOR
Henry H. Covert
BY
Knight Bros
ATTORNEYS.

THE NORRIS PETERS CO., PHOTO-LITHO., WASHINGTON, D. C.

UNITED STATES PATENT OFFICE.

HENRY H. COVERT, OF BROOKLYN, NEW YORK, ASSIGNOR OF ONE-HALF TO HOWARD E. BEDELL, OF NEW YORK, N. Y.

BICYCLE-REST.

SPECIFICATION forming part of Letters Patent No. 563,570, dated July 7, 1896.

Application filed December 21, 1895. Serial No. 572,847. (No model.)

*To all whom it may concern:*

Be it known that I, HENRY H. COVERT, a citizen of the United States, residing at Brooklyn, in the county of Kings and State of New York, have invented certain new and useful Improvements in Bicycle-Rests, of which the following is a specification.

My invention relates to a device for supporting a bicycle in an approximately upright position when not in use, and it aims at a light attachable and detachable structure which can, without any serious increase to the weight of the vehicle, be secured thereto or removed therefrom easily and quickly, and which will serve, when properly fixed and adjusted, as a means for supporting the vehicle when out of action.

In carrying my invention into effect I have devised a rod formed of telescopic sections or tubular parts, being so arranged with relation to each other that when the device is in a collapsed position the said sections will telescope one within the other, thereby forming a compact and easily transportable fixture, which, as above stated, may be removably secured to a suitable part of a bicycle-frame.

At one end of the support I unite a spring-clasp by a universal joint, and at the other end I unite a combined spring clasp and foot by a knuckle-joint.

In order that my invention may be fully understood, I will now describe the same in connection with the accompanying drawings.

Figure 1:
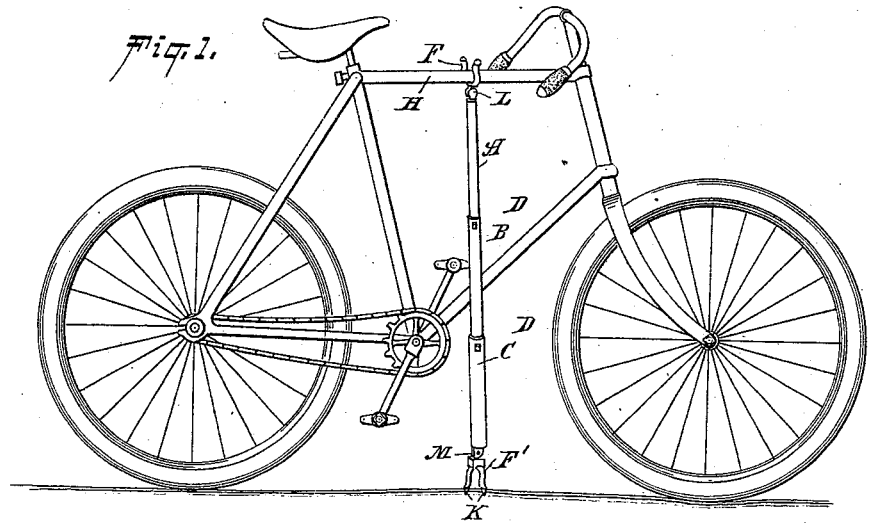
Figure 2:
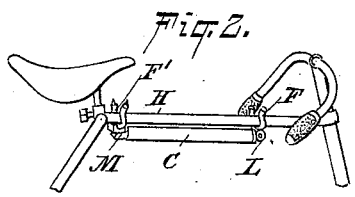
Figure 3:
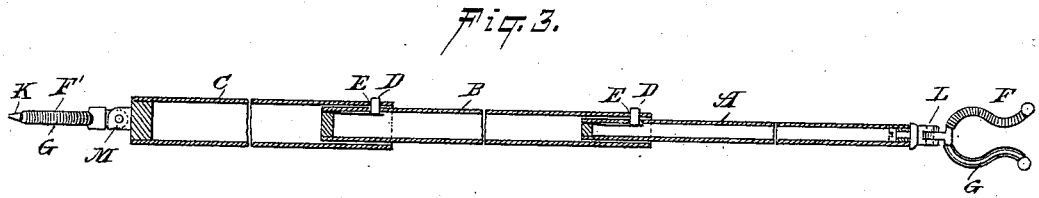
Figure 4:
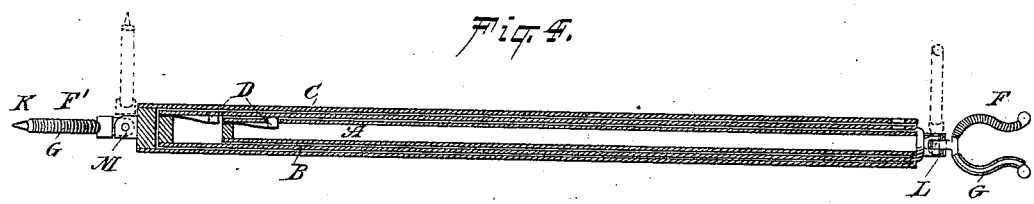

Referring to the drawings, Figure 1 represents a side elevation of a bicycle resting upon one of my improved supports. Fig. 2 shows the rest attached to the bicycle-frame. Fig. 3 represents the rest in the extended position. Fig. 4 shows it in the closed position.

In the drawings, A, B, and C represent three sections of a tubular or telescopic rod adapted, by reason of their structure, to be extended, as shown in Figs. 1 and 3, or to assume, after the manner of closing a telescope, a collapsed condition, as shown in Figs. 2 and 4. Spring locking-catches D are arranged to fit into and interlock with complementary openings or slits E in the contiguous sections, which serve, when the collapsible rod is extended, to firmly maintain the structure in its elongated position. When it is desired to reduce the collapsible rod to a portable shape, the spring-locks D are manipulated in the usual manner, whereupon the telescopic tubes can be thrust one within the other, and the structure will assume its most compact form, as shown in Figs. 2 and 4.

For attachment to the vehicle I provide curved fingers, clasps, or grippers F F', a pair at each end. These grippers are curved to conform to the shape and size of the bicycle-frame and are constructed of resilient metal, so as to give slightly and sufficiently to afford a spring-grip, and they are provided with cushioning-covers G, made preferably of rubber, (though other soft material can be used,) so that when the grippers are placed around the bicycle-frame H, as shown in Fig. 2, the attachment will be firmly secured to the frame, out of the way of the rider, and in a manner that will prevent rattling between the frame and its attachment.

In carrying out my invention I subject these grippers or clasps to a double use, as shown in Fig. 1. In this figure the rest is shown as supporting the bicycle when the latter is not in use. One of the clasps or grippers, F, embraces the bicycle-frame and the other, F', resting upon the ground, becomes a foot and supports the tubular rod, and for its effective working in this respect I provide spurs or prongs K, which sink into the ground, preventing slipping or disturbance of the support when once adjusted. I also provide between the clasp F and the tubular rod a universal joint L, and between the rod and the foot F' a knuckle-joint M, which enable the user to easily secure any adjustment desired.

It will be seen from the above that I have provided an easily-manipulated, portable bicycle rest or support, which, when not in use, can be folded or collapsed to reduce its size, and which can be easily attached to the bicycle-frame or removed therefrom and can be readily extended and formed into a rigid rod and applied as indicated without unnecessary loss of time, in a manner easily understood to the user.

Having thus described my invention, what

I claim, and desire to secure by Letters Patent, is—

A collapsible bicycle support or rest formed of tubular sections joined to each other as shown, and having at one end a spring-clasp united to the rest by universal joint and at the other end a combined spring-clasp and foot united to the rest by a knuckle-joint, all arranged as and for the purposes set forth.

HENRY H. COVERT.

Witnesses:
 M. V. BIDGOOD,
 HERBERT KNIGHT.